W. DALTON.
ELECTRIC LOCOMOTIVE.
APPLICATION FILED AUG. 19, 1913.
1,084,318.
Patented Jan. 13, 1914.
3 SHEETS—SHEET 1.
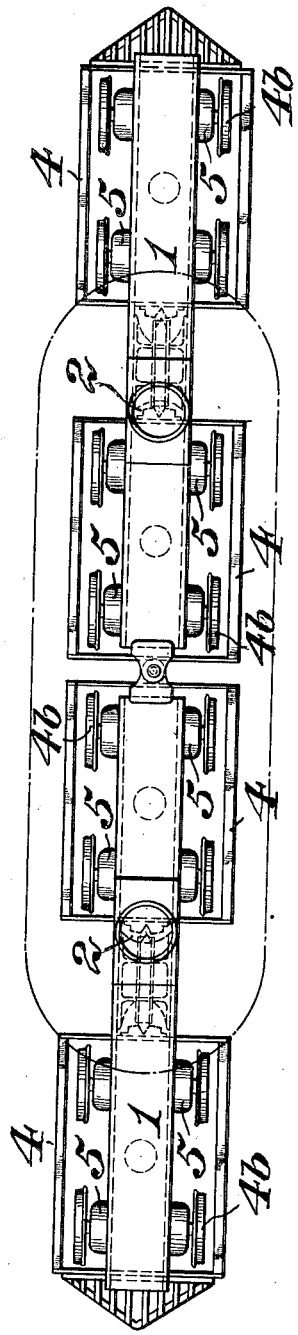
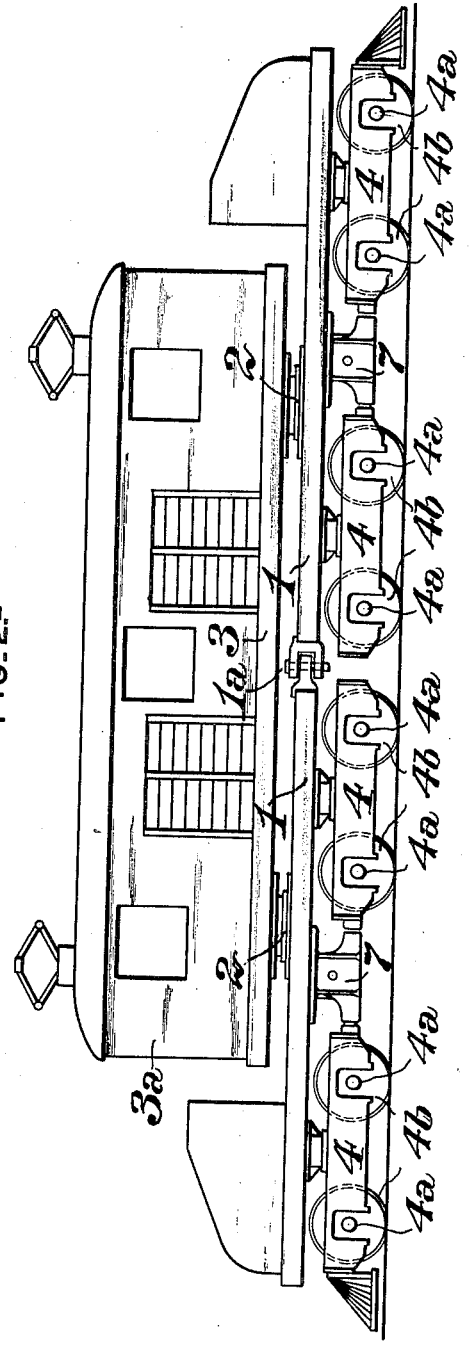

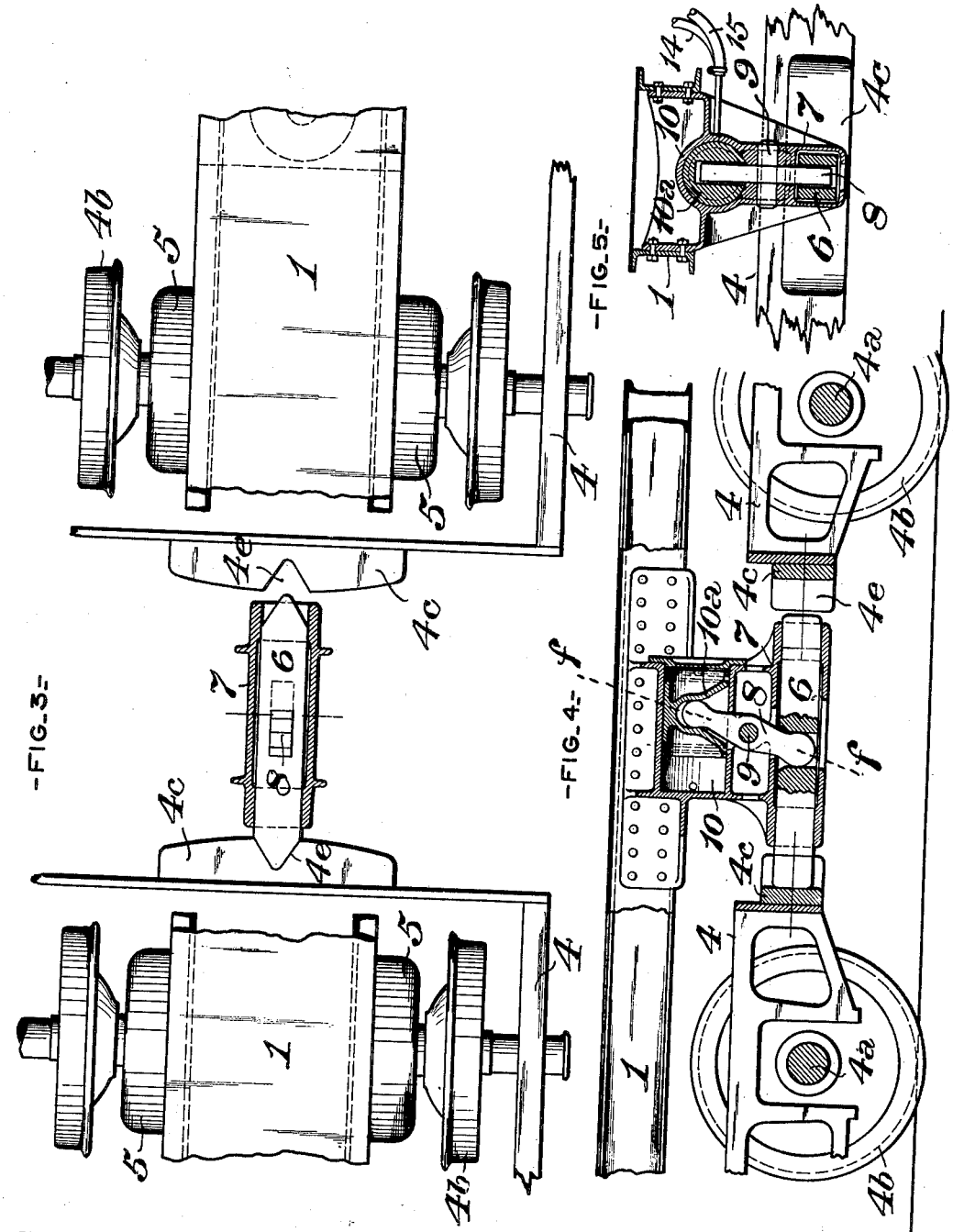

W. DALTON.
ELECTRIC LOCOMOTIVE.
APPLICATION FILED AUG. 19, 1913.
1,084,318.
Patented Jan. 13, 1914.
3 SHEETS—SHEET 3.
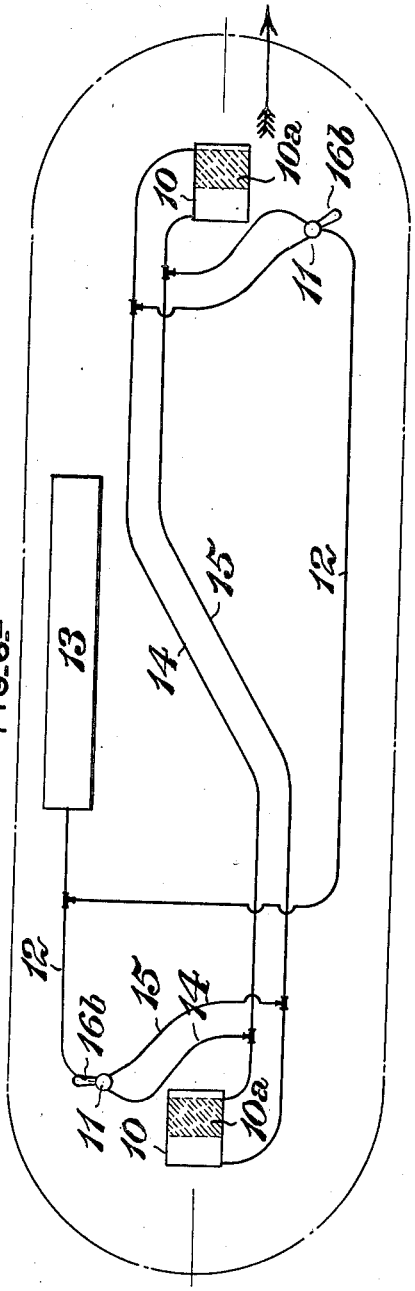
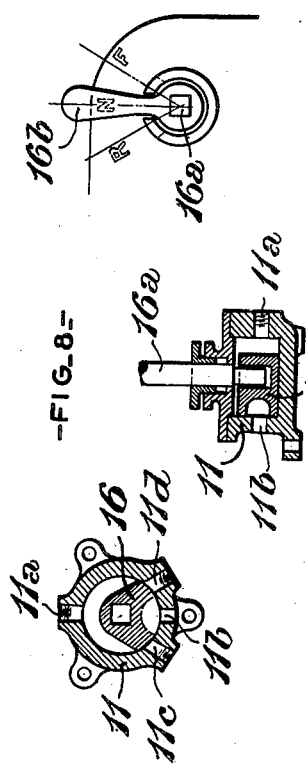
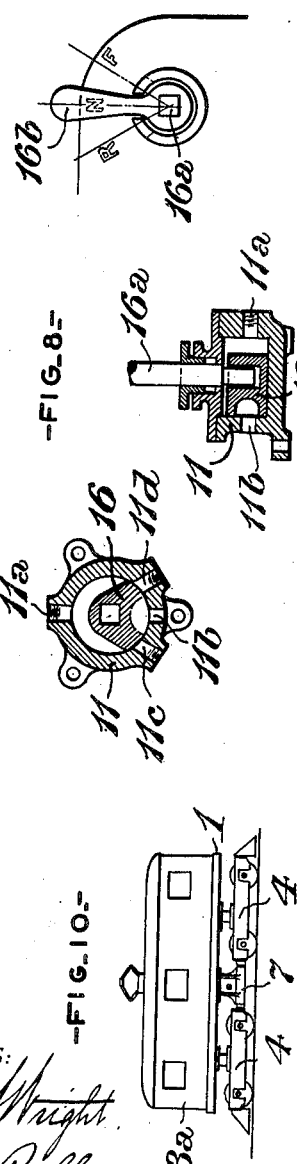
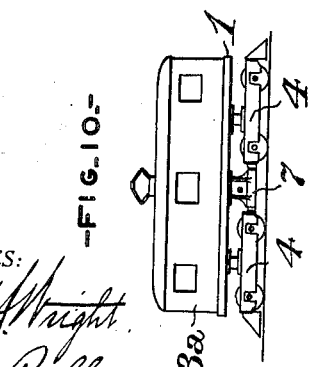
WITNESSES:
Edward A. Wright
S. R. Bell
INVENTOR.
Wm Dalton
by J. Howden Bell,
ATTORNEY.

UNITED STATES PATENT OFFICE.

WILLIAM DALTON, OF SCHENECTADY, NEW YORK.

ELECTRIC LOCOMOTIVE.

1,084,318.        Specification of Letters Patent.        Patented Jan. 13, 1914.

Application filed August 19, 1913. Serial No. 785,470.

*To all whom it may concern:*

Be it known that I, WILLIAM DALTON, of Schenectady, in the county of Schenectady and State of New York, have invented a certain new and useful Improvement in Electric Locomotives, of which improvement the following is a specification.

My invention relates to locomotives which are mounted upon swiveling trucks, and more particularly to improved means for properly guiding locomotives by the use of a system of convertible leading and trailing swiveling trucks, when applied in the support of articulated main frames, but the invention is, however, adapted for application in locomotives having continuous rigid main frames.

The primary object of the invention is to provide a locking means which is adapted, at the will of the operator, to instantly convert a non-swiveling, or a trailing truck, into an effective swiveling or leading truck, and thereby to avoid the great danger incident to the improper use of a non-swiveling trailing truck as a leading truck.

A further object is to provide an easier riding locomotive, and to reduce the excessive wear of tire flanges, rails, and switch points, and also to avoid the great danger of unintentionally causing one of the trucks to enter a siding at high speed; or to leave the rail on sharp curves.

The improvement claimed is hereinafter fully set forth.

In the accompanying drawings: Figure 1 is a plan or top view of an articulated electric locomotive embodying my invention, with the cab frame and cab removed; Fig. 2, a side view, in elevation, of the same; Fig. 3, a plan view, partly in section, and on an enlarged scale, showing the essential parts of a locking device disposed between two truck frames; Fig. 4, a vertical longitudinal section through the locking device and its attachment to the locomotive frame; Fig. 5, a transverse section through the locking device, on the line $f\,f$ of Fig. 4; Fig. 6, a diagrammatic plan view illustrating the system of power fluid conduits, and means for controlling and actuating the locking device, at will, from either end of the locomotive; Fig. 7, a horizontal section through the operator's motive fluid control valve; Fig. 8, a vertical central section through the same; Fig. 9, a plan view of the operator's lever for actuating the control valve; and Fig. 10, a diagrammatic view, illustrating the application of the invention in a two truck locomotive.

My invention is herein exemplified as applied in an electric locomotive having an articulated unit frame comprising two unit sections, 1, 1, which are articulated at their adjoining ends by a coupling pin, $1^a$. Each of the frame sections is provided near its middle, with a center plate bearing, 2, which pivotally supports one end of a cab frame, 3, on which a cab, $3^a$, is mounted, in such manner as to permit free movement of the locomotive around curves. Each of the unit frame sections is supported on two swiveling trucks, 4, each of which is carried on two axles, $4^a$, on which are fixed pairs of wheels, $4^b$, and which are rotated by motors, 5, in the ordinary manner.

In locomotives of the type herein exemplified, it has heretofore been the practice to connect each of the two inner trucks permanently and rigidly to the inner end of the corresponding section of the articulated frame, for the purpose of reducing the excessive, intermittent, and unsteady horizontal oscillations of the trucks about their center plate bearings, caused by the intermittent tractive action of the motor driven wheels upon an imperfect and uneven track. When one wheel of a pair of wheels passes over a slight depression, as at a rail joint, the second wheel would exert its maximum tractive effort; and when the conditions were reversed, the first wheel would be most effective, and thereby there would be transmitted to the truck, a severe, and destructive oscillating or "nosing" action, which would be further transmitted to the entire locomotive. The attempted means of prevention by rigidly fastening one of each pair of trucks to the corresponding articulated frame section, unfortunately causes an equally dangerous and objectionable operation, when either one or the other of the rigidly fastened trucks becomes the leading truck, as determined by the direction of movement of the locomotive. My invention eliminates these objections by making the trucks mutually interconvertible at will by the operator, who, on changing the direction of movement of the locomotive, can instantly convert one of a pair of swiveling trucks into a trailing truck, and the other into a leading truck, or vice versa, by means of a locking device, as will now be described.

In the practice of my invention, I provide, for each of the unit frame sections, 1, a locking bolt, 6, which is fitted to slide longitudinally in a downwardly depending bracket, 7, secured to the frame section, between two trucks, 4, thereof, the lower portion of said bracket forming a guide and support for the locking bolt. The ends of the locking bolt are inwardly tapered or inclined, and each of them is adapted to engage a correspondingly formed recess, $4^e$, in a buffer, $4^c$, secured to the end of the frame of the adjacent truck, 4, as clearly shown in Figs. 3 and 4. The locking bolt is moved into engagement with either one of the recesses, $4^e$, by appropriate movement of a double armed rocking lever, 8, journaled on a pin, 9, fixed in the bracket, 7.

It will be obvious that if the upper arm of the rocking lever, 8, was extended upwardly into the cab, the rocking lever and locking bolt could be manually actuated, but as this would not be practicable in large locomotives, the movements of these members are effected by the piston, $10^a$, of a fluid pressure cylinder, 10, which is formed in the bracket, 7, above the guide of the locking bolt, said piston being suitably recessed to engage the upper arm of the rocking lever. The admission and exhaust of motive fluid to and from opposite ends of the cylinder, are controlled by an operator's valve mechanism, one of which is installed near each end of the cab within convenient reach of the operator. Each of said mechanisms comprises a casing, 11, having a supply port, $11^a$, communicating, by a pipe, 12, with a fluid pressure reservoir, 13; an exhaust port, $11^b$, leading to the atmosphere, and ports, $11^c$, and $11^d$, communicating, by pipes, 14, 15, with the opposite ends of each of the cylinders, 10. The several ports are controlled by a valve, 16, fixed on a stem, $16^a$, which is operated by a handle, $16^b$.

In order to adjust the locking bolts for movement in the direction of the right on the drawings, one or the other of the valves, 16, is turned to the right, so as to admit fluid under pressure to the cylinders, 10, on the left hand sides of their pistons, and thereby move the locking bolts into the position shown in Figs. 3 and 4, in which the left hand truck of each pair is locked to the unit frame section, 1, under which it is located. The right hand truck of each pair is then free to swivel about the axis of its own center bearing, and effectively guide the locomotive to and around any track curvature, as well as to properly lead the connected truck when moving toward the right, thereby performing all the functions of a leading truck. When the left hand truck of either pair is locked to the frame section, the latter constitutes the substantial equivalent of the guiding radius bars ordinarily provided in trailing trucks, and being pivotally connected to the right hand truck, it causes the left hand or trailing truck to freely follow, along the rails, the path of the right hand or leading truck. The adjustment of the locking bolts for movement in the direction of the left on the drawings, is similarly effected, by turning one or the other of the valves, 16, to the left, and thereby admitting fluid under pressure to the right hand ends of the cylinders, 10, and engaging the locking bolts with the recesses of the right hand truck frames. The left hand truck of each pair is then adjusted as a leading truck, and the right hand truck as a trailing truck, in the manner above explained.

As indicated in Fig. 10, my invention is similarly applicable in a locomotive having only two trucks, the cab, $3^a$, being, in such case, mounted directly on a unit frame section, 1.

I claim as my invention and desire to secure by Letters Patent:

1. In a locomotive, the combination of a plurality of swiveling leading and trailing trucks, a frame supported thereon, and means, connected to said frame, for locking a trailing truck in and coincidently releasing a leading truck from, rigid connection therewith, in either direction of movement of the locomotive.

2. In a locomotive, the combination of a pivotally connected articulated frame, a plurality of swiveling leading and trailing trucks supporting each section of said frame, and means, connected to the sections of said frame, for locking a trailing truck in and releasing a trailing truck from, rigid connection therewith, in either direction of movement of the locomotive.

3. In a locomotive, the combination of a frame, a plurality of swiveling leading and trailing trucks supporting said frame, a locking member mounted on the frame and adapted to be brought into engagement with either a leading or a trailing truck and thereby effect rigid connection of said truck with, and the coincident disengagement of the other truck from, the frame, and means for actuating said locking member.

4. In a locomotive, the combination of a pivotally connected articulated frame, a cab frame mounted thereon with the capacity of relative swiveling movement of the sections of the articulated frame, a plurality of swiveling leading and trailing trucks supporting each section of the articulated frame, locking members, each mounted on one of the sections of the articulated frame and adapted to be brought into engagement with either a leading or a trailing truck thereof and thereby effect rigid connection of said truck with the frame section, and means, each mounted on one of the frame sections, for actuating said locking members.

5. In a locomotive, the combination of a frame, a plurality of swiveling leading and trailing trucks supporting said frame, a locking member mounted on the frame and adapted to be brought into engagement with either a leading or a trailing truck and thereby effect rigid connection of said truck with the frame, a motor mounted on the frame and coupled to the locking member, and means for controlling the operation of said motor.

6. In a locomotive, the combination of a frame, a plurality of swiveling leading and trailing trucks supporting said frame, a locking member mounted on the frame and adapted to be brought into engagement with either a leading or a trailing truck and thereby effect rigid connection of said truck with the frame, a fluid pressure cylinder and a source of fluid under pressure, each mounted on the frame, a piston fitting said cylinder and coupled to the locking member, and a manually operable control valve governing the supply and exhaust of fluid under pressure to and from opposite ends of the cylinder.

WILLIAM DALTON.

Witnesses:
E. I. SCHAUBER,
WILL W. HAMBLY.